FIG. I

United States Patent Office 3,833,711
Patented Sept. 3, 1974

3,833,711
REMOVAL OF SULFUR DIOXIDE
FROM GAS STREAMS
John F. Villiers-Fisher, Kendall Park, N.J., assignor to
Chemical Construction Corporation, New York, N.Y.
Continuation-in-part of application Ser. No. 89,868, Nov.
16, 1970, now Patent No. 3,709,977. This application
Aug. 14, 1972, Ser. No. 280,728
Int. Cl. C01b 17/00; C01j 9/041, 9/08
U.S. Cl. 423—244
9 Claims

ABSTRACT OF THE DISCLOSURE

Sulfur dioxide is removed from a gas stream which initially contains sulfur dioxide and sulfur trioxide, by initially contacting the gas stream with discrete porous solid particles of an inorganic alkali which may be in equilibrium with respect to sulfur dioxide absorption and which could be primarily alkali sulfite during much of its effective life. The sulfur trioxide component of the gas stream reacts with the inorganic alkali solid generally, displacing any previously absorbed, sulfur dioxide, and a second gas stream is produced which is substantially devoid of sulfur trioxide. The second gas stream is scrubbed with a liquid containing an active alkaline component for the absorption of sulfur dioxide, and a final gas stream free of sulfur oxides is produced. The invention prevents the absorption of sulfur trioxide by the scrubbing liquid, and thus greatly reduces the build up of sulfates in the scrubbing liquid, which are difficult to regenerate. Thus, a net loss of active alkaline component due to sulfate formation is prevented.

Figure 1:
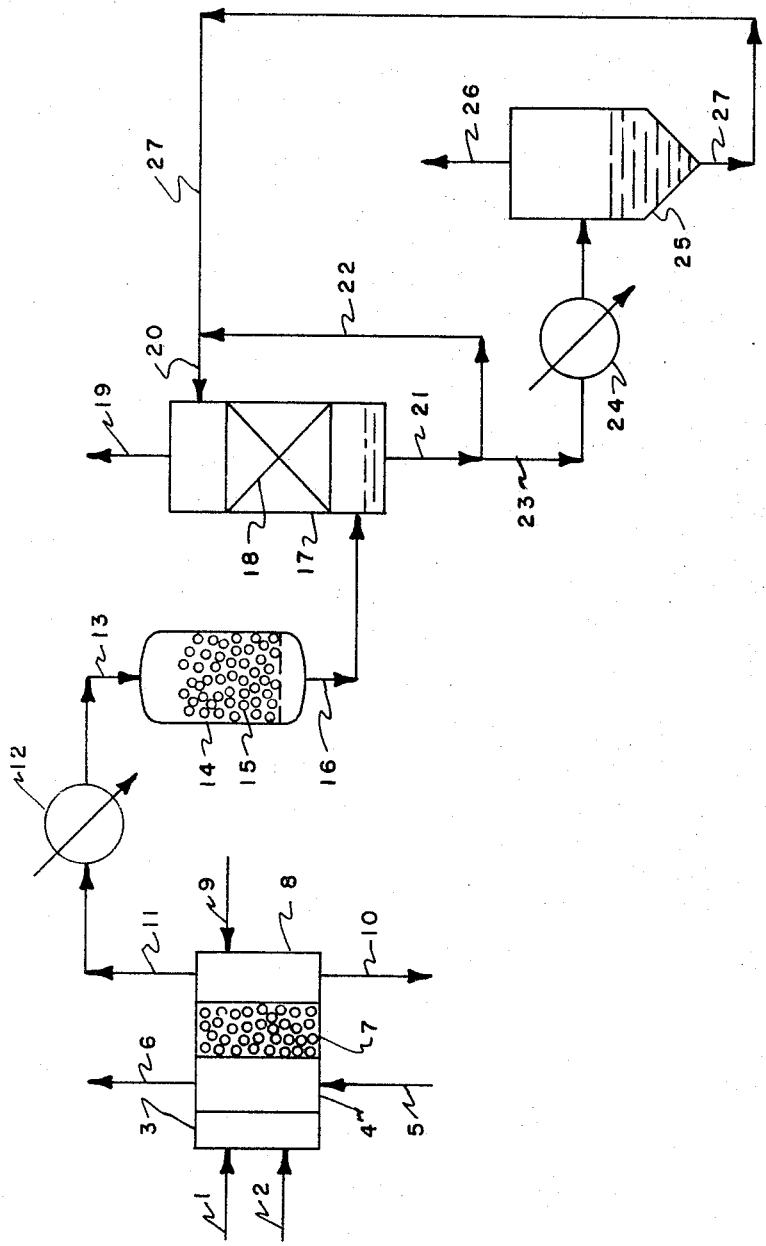

The present application is a continuation-in-part of U.S. Patent Application S.N. 89,868 filed Nov. 16, 1970 now issued as U.S. Pat. No. 3,709,977

BACKGROUND OF THE INVENTION

Field of the Invention

The invention relates to the removal and recovery of sulfur dioxide from gas streams such as waste gas streams discharged from sulfuric acid production facilities, smelters, and steam power plants which burn sulfur-containing coal or oil or the like, in which the gas stream contains sulfur trioxide as well as sulfur dioxide. The invention is particularly applicable to the prevention of air pollution caused by the discharge of sulfur dioxide-containing waste gas streams into the atmosphere.

DESCRIPTION OF THE PRIOR ART

Accompanying our nation's industrial and economic growth, along with increased goods and affluence, is the serious problem of the pollution of the environment. The air, especially, is becoming increasingly polluted with contaminants such as carbon monoxide, hydrocarbons, nitrogen oxides and sulfur oxides, and man is becoming more alarmed by the quality of the air he breathes. An improvement in the prevention of atmospheric pollution due to sulfur oxides is achieved by the present invention.

The most widely practiced prior art procedure for the removal of sulfur dioxide from a gas entails the scrubbing of the gas stream with an aqueous solution or slurry containing an active alkaline component which reacts with the sulfur dioxide to form the corresponding sulfite. A portion or all of the resulting solution or slurry is then passed to regeneration steps which usually include heating to drive off the absorbed sulfur dioxide and regenerate the alkali or alkaline component. In other instances, a portion or all of the spent solution or slurry laden with absorbed sulfur dioxide may be purged or passed to waste disposal. Improvements in alkaline solution or slurry scrubbing of gas streams to remove sulfur dioxide or related technology are described in U.S. Pat. Nos. 3,681,-020; 3,655,338; 3,622,270; 3,653,823; 3,650,692; 3,632,-306; 3,533,748; 3,607,033; 3,600,131; 3,542,511; 3,577,-219; 3,617,212 and 3,607,001.

One of the major problems encountered in the scrubbing of gas streams with alkaline solutions or slurries to remove sulfur dioxide, arises when the gas stream also contains a viable proportion of sulfur trioxide. This sulfur trioxide is concomitantly removed by and absorbed into the alkaline solution or slurry, with the resultant formation of the corresponding sulfate. This alkali sulfate is usually very difficult to regenerate and is usually discarded, and thus represents a loss of valuable active alkaline component. The prior art contains no method for removal of sulfur dioxide and sulfur trioxide from gas streams which is entirely satisfactory. Effluent stack gases which have been scrubbed by these prior art methods may still contain unsatisfactory levels of sulfur pollutants and the problem is especially acute in industries producing sulfur-related compounds such as sulfuric acid. Existing sulfuric acid plants can reduce their emissions of sulfur dioxide simply by altering operating conditions, but the control is limited to about 2,000 parts per million of sulfur dioxide. The dual absorption process can further lower sulfur dioxide emission to about 500 parts per million. But 500 parts per million of sulfur dioxide renders the surrounding air unhealthy.

SUMMARY OF THE INVENTION

In the present invention, a gas stream containing sulfur dioxide and sulfur trioxide is processed in an improved manner for the removal of sulfur oxides. The invention is particularly applicable to the treatment of waste gases prior to the discharge of the waste gases to atmosphere, in which case the efficient removal of the sulfur oxides prevents air pollution when the waste gas is finally discharged to atmosphere. The present invention is specifically directed to the problem of sulfate formation when a gas stream containing both sulfur dioxide and sulfur trioxide is scrubbed with a liquid solution or slurry containing an active alkaline component for the absorption of sulfur dioxide. Within the context of the present invention, it will be understood that reference to a scrubbing solution encompasses both a solution per se containing dissolved active alkaline component and a slurry containing a solution phase and entrained solid particles of active alkaline component.

The present invention is directed to the efficient and effective preliminary removal of sulfur trioxide from a gas stream containing both sulfur trioxide and sulfur dioxide, prior to the removal of sulfur dioxide from the gas stream by scrubbing the gas stream with a liquid solution containing an active alkaline component. The preliminary removal of sulfur trioxide from the gas stream is accomplished by contacting the initial gas stream containing both sulfur dioxide and sulfur trioxide with discrete porous solid particles of an inorganic alkali, with the solid particles being characterized by a high internal surface area. At equilibrium, the solid particles are in equilibrium with regard to sulfur dioxide absorption, and principally contain alkali sulfite, alkali sulfate and unreacted alkali. Thus, when the initial gas stream is passed in contact with the solid inorganic alkali particles, the trioxide is adsorbed and may displace any sulfur dioxide previously absorbed, so that the net effect during normal operation of the process is the absorption of the trioxide to form further alkali sulfate. The resultant gas stream discharged from contact with the porous solid particles of inorganic alkali is now substantially free of sulfur trioxide, but this partially treated gas stream still contains essentially all of the sulfur dioxide initially present in the initial gas stream. The partially treated gas stream is now scrubbed with a liquid solution or slurry containing an active alkaline component for the absorption of sulfur dioxide, and this liquid solution or slurry cannot absorb any sulfur trioxide because of prior removal of this component. Thus, sulfate formation in the liquid solution or slurry is greatly reduced. The resultant fully treated gas stream is now essentially devoid of sulfur oxides, and may be safely discharged to atmosphere without causing air pollution, or this treated gas stream may be further utilized for any desired purpose.

The principal advantage of the present invention is that liquid solutions or slurries containing an active alkaline component may be commercially employed to treat gas streams containing sulfur trioxide as well as sulfur dioxide, for the selective removal of sulfur dioxide, without sulfate formation and therefore without diminishing the activity or useful life of the liquid solution or slurry. Another advantage is that air pollution due to sulfur dioxide emission is prevented in a more economical manner. A further advantage is that mixed waste gas streams containing sulfur trioxide as well as sulfur dioxide may be processed for the removal of sulfur oxides in a more efficient manner.

It is an object of the present invention to prevent air pollution due to sulfur dioxide emission.

Another object is to treat gas streams containing sulfur dioxide and sulfur trioxide in an improved manner for the removal of sulfur oxides.

An additional object is to provide an improved process for the removal of sulfur dioxide from a gas stream using liquid solutions or slurries containing one or a combination of active alkaline components, which may be dissolved in the liquid phase and/or entrained as discrete solid particles in a slurry.

A further object is to prevent the inactivation of liquid solutions or slurries containing active alkaline component due to alkali sulfate formation, when such liquid solutions or slurries are employed for the selective removal of sulfur dioxide from gas streams.

An object is to provide an improved process for the treatment of waste tail gas derived from sulfuric acid production facilities, so as to prevent air polluiton due to the discharge of tail gas.

These and other objects and advantages of the present invention will become evident from the description which follows.

DESCRIPTION OF THE DRAWINGS AND PREFERRED EMBODIMENTS

Figure 2:
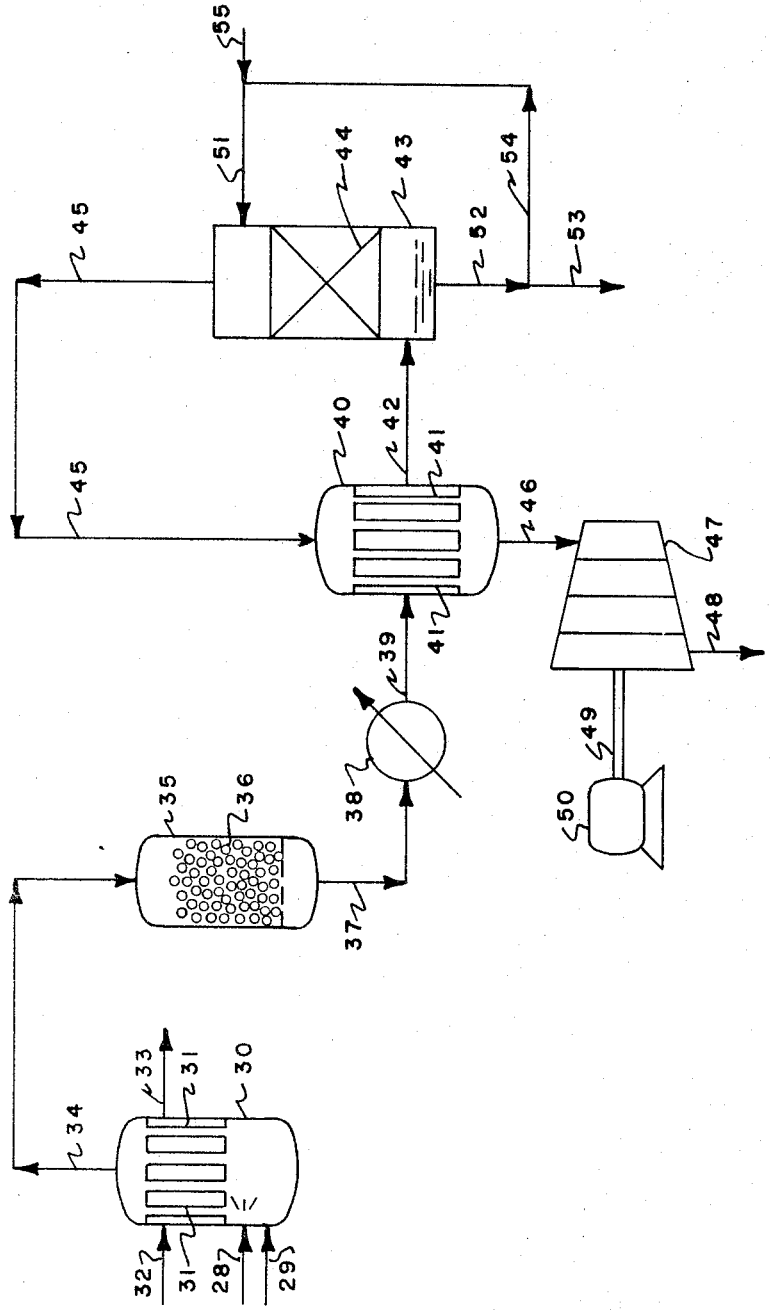

Referring now to the drawings, FIG. 1 is a flowsheet of a preferred embodiment of the invention as applied to the treatment of waste tail gas from a sulfuric acid production facility, and FIG. 2 is a flowsheet of an embodiment of the invention in which hot flue gas is processed for sulfur oxides removal and power recovery.

Referring now to FIG. 1, sulfur stream 1 is burned with pre-dried air stream 2 in the combustion zone of furnace 3 of a sulfuric acid production facility, to produce a hot gas stream usually containing from about 8% to 14% by volume of sulfur dioxide. The hot gas stream passes to heat exchange zone 4 in which the gas stream is cooled, typically by indirect heat exchange with liquid water stream 5 which is heated and vaporized to form steam stream 6. The cooled process gas stream next passes through catalysis zone 7 in which the catalytic oxidation of most of the sulfur dioxide to sulfur trioxide is accomplished. The catalytically converted gas now passes through absorption zone 8 in which the converted gas stream is scrubbed with oleum or concentrated sulfuric acid stream 9 typically of 98% strength, to absorb the sulfur trioxide and form further fortified oleum or sulfuric acid. Product oleum or concentrated sulfuric acid is withdrawn from zone 8 via stream 10.

A residual waste tail gas stream 11 is also discharged from zone 8. Stream 11 typically contains about 0.5% by volume of residual sulfur dioxide, together with lesser amounts of sulfur troxide and an entrained sulfuric acid mist. Stream 11 is heated in heat exchanger or heater 12 to a temperature typically in the range of 70° C. to 140° C., in order to vaporize or evaporate the contained acid mist. The resultant hot gaseous stream 13 discharged from heater 12 is now devoid of liquid droplets, and contains sulfur dioxide and sulfur trioxide as gaseous components, together with minor proportions of water vapor and oxygen, and balance nitrogen. Stream 13 is now processed in accordance with the present invention, by passing stream 13 through unit 14 for contact with an appropriate solid inorganic alkali material disposed as discrete particles 15 within unit 14. The discrete solid particles 15 consist essentially of porous solid particles of an inorganic alkali such as calcium oxide, calcium hydroxide, calcium carbonate, magnesium oxide, magnesium carbonate, sodium hydroxide, sodium carbonate, potassium hydroxide, potassium carbonate, magnesite, dolomite or limestone, and the porous solid alkali particles 15 are characterized by a high internal surface area, typically in the range of about 10 to 100 square meters per gram. A suitable degree or amount of porosity may be imparted to the alkali particles 15 prior to utilization in unit 14 by any suitable means or method, such as calcination, briquetting followed by heating or roasting, etc. The alkali particles 15 may be in an equilibrium condition with respect to reaction with sulfur dioxide, i.e. the particles 15 can contain an equilibrium proportion of alkali sulfite and no effective further absorption of sulfur dioxide from stream 13 into particles 15 takes place at the pseudo-equilibrium which is maintained during normal operating conditions. Thus, the particles 15 during operation essentially contain alkali sulfite, alkali sulfate and residual alkali, and the only reaction which occurs when the gas stream 13 flows through the bed of particles 15 is the substantially complete absorption or adsorption of the sulfur trioxide content of stream 13, which reacts with the alkali sulfite and/or residual alkali in bed 15 to form further alkali sulfate in situ. Reaction of the sulfur trioxide with alkali sulfite results in the displacement of bound sulfur dioxide from the alkali sulfite by the more highly acidic sulfur trioxide, with consequent liberation of the displaced sulfur dioxide into the gas stream.

The resultant process gas stream 16 discharged from unit 14 below particles bed 15 is now substantially devoid of sulfur trioxide, however, stream 16 still contains the sulfur dioxide originally present in stream 13. Stream 16 is now scrubbed with a liquid, which is typically an aqueous liquid solution or slurry, containing an active alkaline component for the absorption of sulfur dioxide. Stream 16 is passed into gas scrubbing tower 17 below gas-liquid contact means 18, which usually consists of a bed of spherical, ring or saddle-type packing, or sieve trays, or bubble cap plates or the like. The gas stream rises through bed 18 and is scrubbed by downflowing liquid solution or slurry containing an active alkaline component, and sulfur dioxide is effectively and substantially completely removed from the gas phase and absorbed into the downflowing liquid solution or slurry. No sulfate is introduced into section 18 because the initial gas stream 16 is substantially free of sulfur trioxide though in some solvents a slow build up due to autoxidation may occur. A suitable oxidation inhibitor such as quinol, glycine or catechol may be present in the liquid phase within section 18, in order to prevent the in situ oxidation of the sulfite or other sulfur-containing compounds formed by sulfur dioxide absorption in section 18. The resultant scrubbed gas which rises from section 18 is now substantially devoid of sulfur oxides, and the scrubbed gas is removed from unit 17 via stream 19 which may now be safely discharged to atmosphere without causing air pollution.

The gas scrubbing liquid or slurry stream 20 is passed into unit 17 above section 18, and flows downwards through section 18 countercurrent to the rising gas phase. Stream 20 consists essentially of any suitable liquid for the selective absorption of sulfur dioxide from the gas phase, and thus stream contains an active alkaline component for the absorption of sulfur dioxide, which may either be a dissolved compound or an entrained solid compound. In the latter instance stream 20 will actually be a slurry, and as mentioned supra, within the context of the present invention it will be understood that reference to stream 20 as a liquid encompasses and includes instances when stream 20 is actually a slurry which contains a liquid solution phase and entrained solids. Thus in some instances stream 20 will be an aqueous solution containing a dissolved active alkaline component such as the sulfite, hydroxide and/or carbonate of sodium, potassium, calcium, magnesium and/or barium or mixtures thereof. In instances when stream 20 contains a sulfite, subsequent absorption of sulfur dioxide will usually result in bisulfite formation in the liquid phase. In other cases stream 20 may be an aqueous slurry containing discrete solid particles of an active alkaline component such as the oxide, hydroxide and/or carbonate of calcium, magnesium and/or barium or mixtures thereof. The active alkaline component in stream 20 may in some cases consist of an alkanolamine such as monoethanolamine, diethanolamine, triethanolamine and/or propanolamine. Other suitable active alkaline components and suitable carrier liquid phases such as a petroleum refining fraction, an aliphatic alcohol, dimethyl sulfoxide, or carbon tetrachloride, will occur to those skilled in the art and may be employed in suitable instances.

In any case, stream 20 flows downwards through section 18 and effectively scrubs and dissolves sulfur dioxide from the rising gas stream. The resultant scrubbing liquid or slurry containing dissolved and absorbed sulfur dioxide, usually in the form of a sulfite, a bisulfite or the like, collects in the lower end of unit 17 and is removed via stream 21, which may be divided into direct recycle stream 22 and bleed stream 23, which is processed for sulfur dioxide removal. Stream 23 is heated in heater 24 to evolve a sulfur dioxide-rich gas phase and the resultant stream is passed into gas-liquid separator 25, which may be operated at a reduced pressure relative to stream 23 or intensive steam stripping may be employed. In any event, a sulfur dioxide-rich gas stream 26 is removed from unit 25 and passed to suitable utilization and/or sulfur dioxide recovery. Thus, stream 26 may be refrigerated to condense product liquid sulfur dioxide, or stream 26 may be passed to a sulfuric acid production facility, as for example unit 7 described supra, for conversion to sulfur trioxide and sulfuric acid. The regenerated liquid phase stream 27 is removed from the bottom of the baffled and/or cyclonic separator 25, and stream 27 is combined with stream 22 for recycle via stream 20. In some instances, all of stream 21 may be processed via stream 23, in which case stream 22 will be omitted.

Referring now to FIG. 2, an alternative embodiment of the invention as applied to the treatment of a waste stack or flue gas generated by fuel combustion is presented. Fuel stream 28 is burned with combustion air stream 29 in the lower portion of steam boiler 30. Stream 28 may be any suitable sulfur-containing fuel, and stream 28 is usually a carbonaceous or hydrocarbon fuel such as anthracite or bituminous coal, lignite, crude oil, a petroleum refining fraction such as fuel oil or bunker C residual oil derived from petroleum refining, or the like. The combustion of sulfur-containing fuel stream 28 with air stream 29 results in the generation of a hot combustion gas stream which rises through the tubes 31 of steam boiler 30. Boiler feed or condensate water stream 32 is circulated external to tubes 31 and is vaporized to form steam stream 33 which is passed to utilization in a steam turbine or the like, not shown. The vaporization of stream 32 external to tubes 31 cools the hot combustion gas in the tubes 31 to an intermediate reduced temperature, and the resultant partially cooled combustion effluent gas is removed from the upper portion of unit 30 via stream 34.

Stream 34 is typically at a temperature in the range of 400° C. to 1000° C., and stream 34 principally contains, as gaseous components, nitrogen, residual oxygen, carbon dioxide, water vapor, sulfur dioxide and sulfur trioxide. Stream 34 will usually also contain entrained solid particles of fly ash or the like. Initial processing of stream 34 in this case will usually consist of suitable treatment, not shown, to remove entrained solid particles by filtration, electrostatic precipitation, centrifugal separation in cyclonic separators, or the like. The resultant solids-free stream 34 is now processed in accordance with the present invention.

Stream 34 is passed into container 35 at a temperature typically in the range of 400° C. to 1000° C. Container 35 is provided with a bed or beds 36 consisting of discrete porous solid particles of inorganic alkali similar in configuration and function to the bed 15 described supra. In typical applications, bed 36 will consist of ⅛" to ¼" diameter solid particles of inorganic alkali such as lump lime which has been produced by calcining natural limestone. These porous particles are characterized by a high internal surface area such as about 10 to 100 square meters per gram. A space velocity generally in the range of 200–3000 v./v. per hour is maintained in bed 36, depending on particle size, and a typical space velocity of 700 to 1000 v./v. per hour will be provided in bed 36. When the charge of bed 36 consists of lump lime, at equilibrium the particles will be a mixture of calcium oxide, calcium sulfite and calcium sulfate. Sulfur trioxide is absorbed into bed 36, and the resultant stream 37 discharged from the lower portion of unit 35 is now substantially devoid of sulfur trioxide, however, stream 37 contains a proportion of sulfur dioxide comparable to stream 34.

Stream 37 is now preferably cooled in waste heat steam boiler or economizer 38, and the resultant stream 39, now at a reduced temperature typically in the range of 350° C. to 700° C., is passed into the shell of gas-to-gas heat exchanger 40 external to tubes 41 for further cooling. As will appear infra, the cooling of stream 39 in heat exchanger 40 represents a preferred embodiment of the present invention, and the resultant fully cooled gas stream 42 removed from the shell of unit 40 is now at a greatly reduced temperature typically in the range of 40° C. to 80° C. This cooling to a low temperature in an important aspect and advantage of the present invention which results in greater useful heat recovery, and the very low temperature of stream 42 is accomplished due to the prior removal of sulfur trioxide in unit 35, since if stream 39 was not substantially devoid of sulfur trioxide, the fully cooled gas stream 42 would have to be removed from unit 40 at a considerably higher temperature typically in the range of 200° C. to 250° C. because further temperature reduction in the presence of sulfur trioxide would result in the condensation of the extremely corrosive $H_2SO_4$ on the exchanger and formation of an acid mist which would be difficult to remove from the gas stream. Thus, since stream 42 is devoid of sulfur trioxide in the present process, stream 42 may be cooled to considerably lower temperatures with concomitant increased useful heat recovery for conversion to usable power.

Stream 42 is now scrubbed in unit 43 for sulfur dioxide removal using a liquid solution or slurry containing an active alkaline component. The gas stream rises through gas-liquid contact section 44 within unit 43, and sulfur dioxide is dissolved and absorbed into the liquid phase. Because of prior removal of sulfur trioxide in unit 35, no sulfate formation takes place in the liquid phase within section 44. In addition, final traces or amounts of entrained solid particles are removed from the gas phase in section 44, so that the cleaned and scrubbed gas stream 45 removed from the upper end of unit 43 at a temperature typically in the range of 25° C. to 60° C. is now substantially devoid of sulfur oxides and entrained solid particles, and thus stream 45 is eminently suitable for usage, after reheat, as a motive gas for power generation in a gas turbine.

Stream 45 is passed to unit 40 and flows downwards through the tubes 41, and is thereby heated by indirect heat exchange with gas stream 39. The resultant hot gas stream 46 discharged from the lower end of unit 40 at a temperature typically in the range of 300° C. to 700° C. is passed into gas turbine 47 and is expanded in turbine 47 to produce useful power. The exhaust gas stream 48 discharged from turbine 47 is discharged to atmosphere without causing air pollution. Stream 48 is discharged from unit 47 at a low outlet temperature, typically in the range of 80° C. to 120° C., with resultant high conversion of heat energy to useful power. The low outlet temperature of stream 48 is permissible because no sulfur trioxide condensation can take place in turbine 47, since the sulfur trioxide was previously removed from the gas stream in unit 35. Turbine 47 may be connected with any power consumption means or device, such as a pump, blower, etc., or other mechanical apparatus. In this embodiment of the invention, turbine 47 is connected via shaft 49 to electrical generator 50, so that turbine 47 drives generator 50 which thereby generates useful electrical power.

Returning to unit 43, liquid solution or slurry stream 51 containing an active alkaline component for sulfur dioxide absorption is passed into unit 43 above section 44. Stream 51 is generally comparable in composition and function to stream 20 described supra, and stream 51 may contain any one or a combination of the active alkaline components described supra as usable in stream 20. In addition, stream 51 may contain a suitable oxidation inhibitor to prevent the in situ oxidation of sulfite to sulfate within unit 43. The resultant scrubbing liquid solution or slurry laden with absorbed and dissolved sulfur dioxide collects in the lower portion of unit 43 and is removed via stream 52, which is divided into bleed stream 53 and recycle stream 54. Stream 53 is regenerated in a manner comparable to stream 23 described supra, and the resultant regenerated liquid solution or slurry stream 55 is combined with stream 54 to form stream 51.

Numerous alternatives within the scope of the present invention, besides those alternatives mentioned supra, will occur to those skilled in the art. Units 17 and/or 43 may in practice consist of any suitable type of gas-liquid contactor, such as a spray tower or a venturi type of scrubber. In instances when streams 20 and/or 51 consist of a slurry, the resultant bleed streams 23 and/or 53 may alternatively be filtered or centrifuged, to remove the solids component, and this solids component would then be separately calcined to evolve a sulfur dioxide-rich off-gas comparable to stream 26 and to produce a regenerated solid active alkaline component.

Examples of industrial application of the present invention will now be described.

Example I

With reference to the FIG. 1 embodiment of the invention, following is data relative to principal process streams for a typical application. In practice, using a sodium sulfite-bisulfite solution for stream 20, the resultant stream 23 may be regenerated using steam stripping as an alternative to or in addition to the procedure described supra. All of stream 21 was passed to regeneration via stream 23.

TABLE I

| Stream number | 11 | 13 | 16 | 19 | 27 | 21 |
|---|---|---|---|---|---|---|
| Sulfur dioxide, vol. percent | 0.45 | 0.45 | 0.45 | 0.05 | [1] 4.5 | [1] 5.3 |
| Sulfur trioxide, vol. percent | 0.007 | 0.007 | [2] 0.5 | [2] 0.3 | | |
| Oxygen, vol. percent | 10.35 | 10.35 | 10.35 | 10.35 | | |
| Na, mol/100 mol $H_2O$ | | | | | 8.0 | 8.0 |
| $SO_4^-$, mol/100 mol $H_2O$ | | | | | 1.0 | 1.0 |
| Temperature, ° C | 81 | 127 | 125 | 27 | 25 | 27 |
| Pressure, p.s.i.a | 16 | 15.9 | 15.3 | 15 | | |
| Flow rate, nm.³/min | 708 | 708 | 708 | 705 | [3] 25.1 | [3] 25 |

[1] Mols/100 mol $H_2O$.
[2] Parts per million.
[3] Mols/minute.

Example II

With reference to the FIG. 2 embodiment of the invention, following is data relative to principal process streams for a typical application, in which a hydrogen-containing fuel such as fuel oil was burned in unit 30, so that stream 34 contain a viable proportion of water vapor, most of which was subsequently removed by cooling stream 42 from 155° C. to 40° C. to attain the condensation of liquid water which was then removed from the system at a rate of 670 mols/hour. The flow rate of stream 34 was 10,000 mols/hour.

TABLE II

| Stream number | 34 | 37 | 39 | 42 | 42' | 45 | 46 | 48 |
|---|---|---|---|---|---|---|---|---|
| Sulfur dioxide, vol. percent | 0.3 | 0.3 | 0.3 | 0.3 | 0.3 | 0.02 | 0.02 | 0.02 |
| Sulfur trioxide, p.p.m | [2] 0.003 | 0.05 | 0.05 | 0.05 | 0.05 | 0.03 | 0.03 | 0.03 |
| Carbon dioxide, vol. percent | 16.7 | 16.7 | 16.7 | 16.7 | 16.7 | 16.7 | 16.7 | 16.7 |
| Nitrogen, vol. percent | 75.8 | 75.8 | 75.8 | 75.8 | 75.8 | 75.8 | 75.8 | 75.8 |
| Water, vol. percent | 7.2 | 7.2 | 7.2 | 7.2 | 0.7 | 0.7 | 0.7 | 0.7 |
| Temperature, ° C | 650 | 650 | 520 | 155 | 40 | 35 | 400 | 120 |
| Pressure, atmospheres | 15 | 14.8 | 14.7 | 14.5 | 14.4 | 14.3 | 14 | 1 |

[1] After cooling to condense and remove 670 mols/hour of water.
[2] Volume percent.

I claim:

1. A process for the removal of sulfur dioxide and sulfur trioxide from a gas stream which comprises contacting a first gas stream containing sulfur dioxide and sulfur trioxide with discrete porous solid particles of an inorganic alkali selected from the group consisting of calcium oxide, calcium hydroxide, calcium carbonate, magnesium oxide, magnesium carbonate, sodium hydroxide, sodium carbonate, potassium hydroxide, potassium carbonate, magnesite, dolomite, and limestone, said solid particles having a high internal surface area, said inorganic alkali being at an equilibrium condition with respect to reaction with sulfur dioxide whereby sulfur trioxide reacts with said inoragnic alkali without sulfur dioxide absorption and a second gas stream containing sulfur dioxide and substantially free of sulfur trioxide is produced, and scrubbing said second gas stream with a liquid, said liquid containing an active alkaline component for the absorption of sulfur dioxide, whereby sulfur dioxide is absorbed into said scrubbing liquid and a third gas stream substantially free of sulfur oxides is produced.

2. The process of claim 1, in which said liquid is an aqueous solution containing a dissolved active alkaline component selected from the group consisting of the sulfites, hydroxides and carbonates of sodium, potassium, calcium, magnesium and barium.

3. The process of claim 1, in which said liquid is an aqueous slurry containing discrete solid particles of an active alkaline component selected from the group consisting of the oxides, hydroxides and carbonates of calcium, magnesium and barium.

4. The process of claim 1, in which said active alkaline component is an alkanolamine selected from the group consisting of monoethanolamine, diethanolamine, triethanolamine, and propanolamine.

5. The process of claim 1, in which said porous solid particles have an internal surface area in the range of about 10 to 100 square meters per gram.

6. The process of claim 1, in which said first gas stream is a hot waste gas stream and said first gas stream is contacted with said porous solid particles at a temperature in the range of 400° C. to 1000° C.

7. The process of claim 1, in which said second gas stream is cooled to a temperature in the range of 50° C. to 150° C. by indirect heat exchange with a fluid, prior to scrubbing said second gas stream with said liquid.

8. The process of claim 1, in which said first gas stream contains entrained sulfuric acid mist, and said first gas stream is heated to a temperature in the range of 70° C. to 140° C. prior to contacting said first gas stream with said porous solid particles of inorganic alkali, whereby said mist is evaporated into said first gas stream.

9. The process of claim 1, in which said first gas stream is a waste tail gas from the production of sulfuric acid, and said third gas stream is discharged to atmosphere.

References Cited

UNITED STATES PATENTS

| | | | |
|---|---|---|---|
| 3,653,823 | 4/1972 | Shah | 423—242 |
| 3,632,306 | 1/1972 | Villiers-Fisher | 423—242 |
| 2,718,453 | 9/1955 | Beckman | 423—244 |
| 1,989,004 | 1/1935 | Fife | 423—243 |

FOREIGN PATENTS

| | | | |
|---|---|---|---|
| 872,984 | 7/1961 | Great Britain | 423—244 |

GREGORY H. HELLER, Assistant Examiner

U.S. Cl. X.R.

423—539